HYPHEN-BASED LINE COMPOSING APPARATUS AND METHOD

Filed June 8, 1967 4 Sheets-Sheet 1

INVENTORS
Allan Friedman
James V. Spano

BY Lawrence E. Laubscher
ATTORNEY

HYPHEN-BASED LINE COMPOSING APPARATUS AND METHOD

INVENTORS
Allan Friedman
James V. Spano
BY
Laurence C. Laubscher
ATTORNEY

HYPHEN-BASED LINE COMPOSING APPARATUS AND METHOD

Filed June 8, 1967

INVENTORS
Allan Friedman
James V. Spano
BY
Lawrence E. Laubscher
ATTORNEY

HYPHEN-BASED LINE COMPOSING APPARATUS AND METHOD

Filed June 8, 1967 4 Sheets-Sheet 4

INVENTORS
Allan Friedman
James V. Spano

BY Lawrence E. Laubscher
ATTORNEY

United States Patent Office 3,529,296
Patented Sept. 15, 1970

3,529,296

HYPHEN-BASED LINE COMPOSING APPARATUS AND METHOD

Allan Friedman, Highland Park, and James V. Spano, Evanston, Ill., assignors to Filmotype Corporation, Skokie, Ill., a corporation of Illinois
Filed June 8, 1967, Ser. No. 644,513
Int. Cl. G06c *11/10*
U.S. Cl. 340—172.5 12 Claims

ABSTRACT OF THE DISCLOSURE

A hyphen-based system and method for adding end-of-line signals to a series of first character and word space signals to divide the same into lines of substantially equal length. The first signals are obtained from a first register into which they have been entered (1) without any regard to line length, character width, font, type size or the like, (2) with single hyphens inserted between the syllables of each multi-syllable word, and (3) with double hyphens inserted when a single hyphen is actually to appear in the text. Hyphen acceptance circuit means accept only one of the double hyphens when outside the justification zone, and operate an end-of-line signal generator when either a single hyphen or a double hyphen is received when in the justification zone.

This invention relates generally to code translating and data processing apparatus for adding to an unjustified series of first signals taken from an input register a plurality of end-of-line signals, whereby the series is divided into lines of substantially equal length. More particularly, the invention relates to a hyphen-based composing system including hyphen acceptance circuit means for accepting—when outside the justification zone—only one of a pair of successive hyphen signals that are initially entered in the first register when it is desired for a single hyphen to actually appear in the composed text, and for accepting—when within the justification zone—either the first single hyphen originally inserted in the input register between the syllables of multi-syllable words, or one of the pair of successive hyphens.

Hyphen-based composing systems have been previously proposed in the patented prior art, as evidenced by the U.S. patents to Higonnet et al. No. 2,968,383 of Jan. 17, 1961, and Bafour et al. No. 2,762,485 of Sept. 11, 1956. In these systems use is made of a special auxiliary hyphen key on the keyboarding apparatus by which the data is coded as an input to a first register. The known systems are limited generally to use as a direct input to type setting apparatus, and have certain inherent structural and functional drawbacks which prevent their use as code translating apparatus. For example, in addition to requiring a special keyboarding apparatus for initially entering the data into the input register, the systems require the use of special codes other than those conventional in the art.

The primary object of the present invention is to provide a hyphen-based composing system and method for inserting into a series of unjustified first signals obtained from an input register (for example, conventional six-level perforated tape) a plurality of end-of-line signals dividing said first signals into lines of substantially equal length, and for subsequently recording the first signals and end-of-line signals on an output register (for example, magnetic tape adapted for use as an input record for photocomposing apparatus). The invention is characterized in that the signals are initially entered into the first register by conventional keyboarding means, single hyphens being inserted between the syllables of multi-syllable words, and with two successive hyphens (or em dashes) being inserted each time a hyphen (or em dash) actually appears in the text being composed. During this initial keyboarding, no consideration is given to line length, justification, type style or size, character width or the like. Translating means including a hyphen (or em dash) acceptance circuit is provided for processing the data from the first register and for recording the same—together with end-of-line signals that divide the data into lines of equal length—on an output register. The acceptance circuit means are operable—when the line length is outside the justification zone—to disregard the single hyphens and to transmit to counter means of the translator only one of the double hyphens appearing in the series of signals being processed. When the counter means generates a J-zone signal indicating that the line length is within the selected justification zone, the hyphen acceptance circuit accepts the next hyphen (appearing alone or as one of a hyphen pair) and transmits the same to the counter-recorder together with an end-of-line signal.

In accordance with the present invention, separate machines are utilized in recording the data in a first register on the one hand, and for transcribing it in justified form on a second register. One advantage resulting from the use of these separate machines lies in relieving the operator from determining the characters to be contained within a justified line at the time of keyboarding the text matter on the first register. A second advantage lies in that use is permitted of inexpensve typewriter and perforator machines without counting mechanisms, line length indicators or unit scales, and that lines may be composed without typographical skill and without the association of an expensive computer to convert the unjustified signals on a first register into a series of signals having a justification code and an end-of-line signal for each line.

A more specific object of the invention is to provide a composing system wherein text is composed a single time by a conventional keyboard for entry in a first register, and is converted by translating means for recordation in a second register with end-of-line signals added thereto. The translating means is operable to add to the second register justification code instructions, whereby the text is designed to suit any desired number of different styles, sizes, and set widths of type in any desired number of different line or column widths. The conventional keyboard machine is operable to produce typewritten hard copy and to enter coded information corresponding to the selected characters and spaces of the text in the register, which register may comprise a perforated tape, magnetic record or the like.

A further object of the invention is to provide a data processing system based on a conventionally keyboarded advisory character (specifically, the lower case "hyphen" and the upper case "em dash"), whereby data may be readily composed from a master record on which the data has been entered without regard to line length, the advisory character being subsequently utilized in the data processing step to assist in properly dividing the text material into lines of equal length.

Other objects and advantages of the invention will become apparent from a study of the following specification when considered in conjunction with the accompanying drawing, in which.

Figure 1:
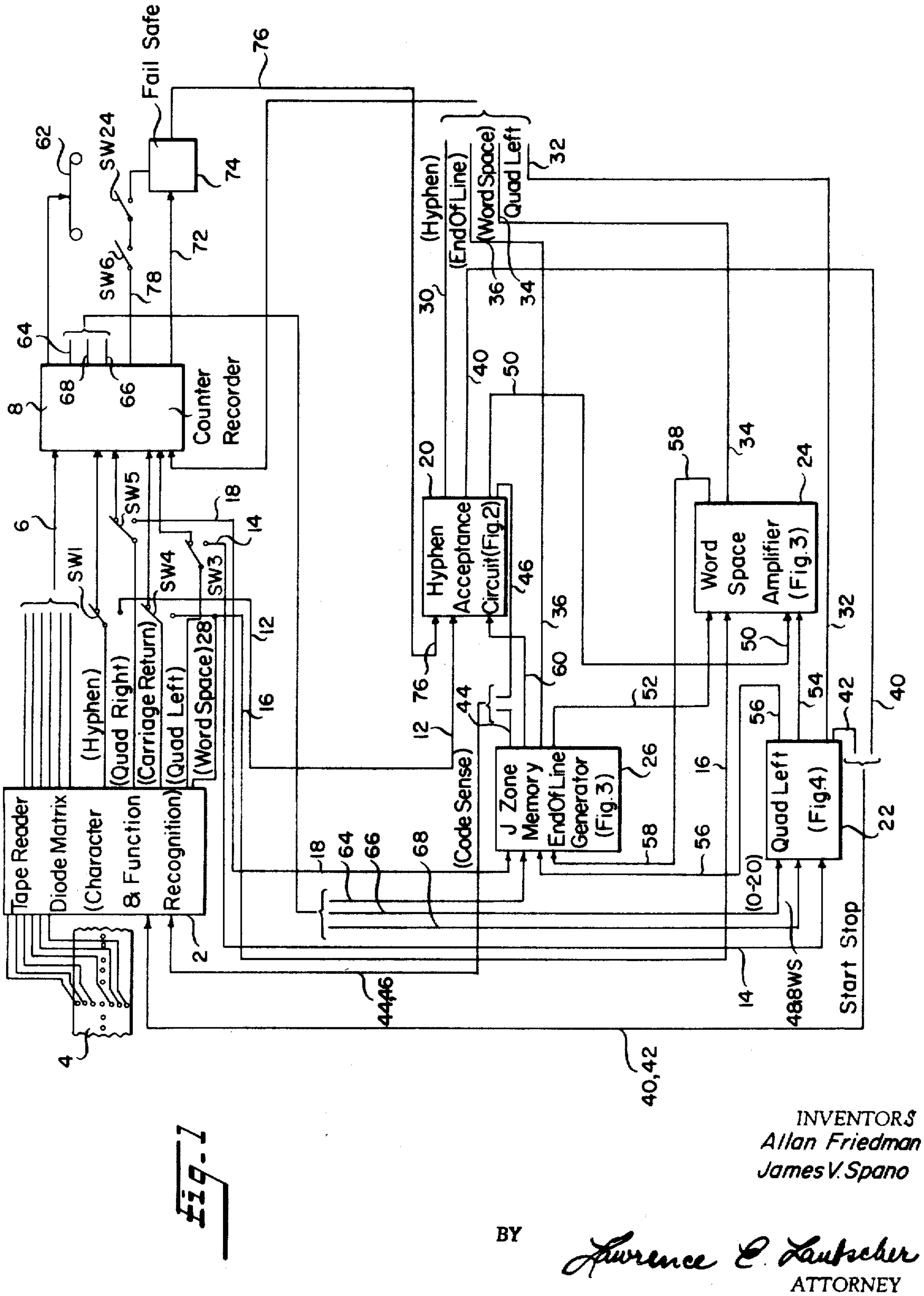
FIG. 1 is a block diagram illustrating the improved code translating system of the present invention.

Referring to FIG. 1, the system includes conventional tape reader and matrix means 2 operable to sense data keyboarded upon an input register 4 (such as a six-level perforated tape). It will be assumed, for the purpose of the following discussion, that the keyboarding of tape 2 has been accomplished by means of a conventional tape perforator including quad left (i.e., end of paragraph), quad right, carriage return, word space and character keys, the keyboard of said perforator including only the conventional single hyphen key (the upper case of which carries an em dash character). It will be assumed further that during the initial keyboarding of the text data on the tape 4, each time a multi-syllable word is typed for entry as a series of coded perforations on the tape, the hyphen key is struck once between at least two of the syllables of longer length, whereby words hyphenated into syllables (normally having less than seven average characters) are recorded on the tape 4. It will be further assumed that during the initial keyboarding, each time a hyphen (or em dash) actually appears in the text being keyboarded, the hyphen key is struck twice in succession, whereby two successive hyphen (em dash) signals are recorded as successive code perforations on the tape.

It is important to note that during the initial keyboarding of the text, no regard is given to line length, justification range, type size, font selection or the like.

As is conventional in the art, the tape reader matrix includes sixty-three characteristic output terminals upon which appear voltages corresponding to character, space, hyphen, quad right, quad left, carriage return and word space signals, respectively. The character signal output terminals are connected by conductors 6 directly to the input terminals of conventional counter-recorder apparatus 8 (similar to that disclosed in the Gardberg U.S. Pats. Nos. 3,067,660 and 3,067,661). The hyphen, quad left, carriage return and quad right matrix output terminals are connected with the counter-recorder via the normally closed contacts of two-position mode switches SW1, SW3, SW4 and SW5, respectively. The remaining stationary contacts of these switches are connected—via conductors 12, 14, 16 and 18—with the input terminals of hyphen acceptance circuit 20, quad left circuit 22, word space amplifier 24 and the end-of-line signal generator means 26, respectively. It is important to note that the word space output terminal of the matrix is connected by conductor 28 with the normally open contact of carriage-return switch SW4, whereby word space signals are always fed to the word space amplifier 24 via conductor 16 regardless of the position of mode switch SW4, the carriage return signals being transmitted as word space signals to the word space amplifier only when the switch SW4 is switched to the second operating mode.

The hyphen acceptance, quad left, word space amplifier and end-of-line signal generating means include output terminals connected with the appropriate input terminals of counter recorder 8 via conductors 30, 32, 34 and 36, respectfully. The hyphen acceptance and quad left circuits include further output terminals connected with the start-stop means of the tape reader via conductors 40 and 42, and the end-of-line generator and hyphen acceptance circuit means include output terminals connected with the code sense means of tape reader 2 via conductors 44 and 46, respectively. The hyphen acceptance, end-of-line generator, and quad left circuits have other outputs connected with the inputs of word space amplifier 24 via conductors 50, 52 and 54, respectively, and the quad left and word space amplifier circuits have additional outputs connected with the inputs of the end-of-line generator via conductors 56 and 58, respectively. The end-of-line generator has a further output connected with the input of hyphen acceptance circuit 20 via conductor 60.

As described in the aforementioned Gardberg patents, the counter-recorder 8 is operable to record on a suitable record 62 (for example, magnetic tape) the character signals together with their relative width values. If desired, the width values may be obtained by the selective use of one of a plurality of width card means associated with the counter-recorder 8 as taught by the prior Friedman Pat. No. 2,924,157. The recorder 8 is also operable to record a justification instruction code, and, as will be described below, an end-of-line signal.

The counter-recorder 8 includes means (not shown) for manually setting a desired line width value, and means for generating a "J-zone" signal when the sum of the character and word space widths of the signals supplied to the counter exceeds a given value (approximately 70 units) less than line length (i.e., when the input series of signals enters the "justification zone"). This J-zone signal is supplied to an additional input terminal of the end-of-line generator via conductor 64. The counter-recorder 8 is operable also to supply to quad left circuit 22 via conductors 66 and 68 a "4 and 8 word space" signal and a "0 to 20" signal, respectively. The 4 and 8 word space signal is an enabling signal for operating the quad left circuit means to assure recordation of a given number (generally, four) of word spaces on the second register 62 when the number of word spaces in a line is less than this number. The 0 to 20 signal is a disabling signal inhibiting operation of the quad left circuit means immediately prior to the termination of the line (i.e., when the line length is within the justification zone but less than line length in groups of 10 up to 20 set width units).

Finally, the counter-recorder has an output terminal connected with the hyphen acceptance circuit 20 via conductor 72, fail safe circuit 74 and conductor 76, said fail safe circuit being enabled by the counter-recorder 8 via conductor 78, mode switch SW6 and safety switch SW24. The fail safe means is so operable that in the event that no hyphen or word space is received from the tape reader when the line length is in justification zone and subsequent characters exceed line length, the last character that caused the overrun condition operates the fail safe circuit to automatically produce an end of line condition. Thus, when line length exhausts the justification zone, an arbitrary end of line signal is introduced to insure that the line will not be overset and that space is reserved on the succeeding line for the balance of the overrun word.

Figure 2:
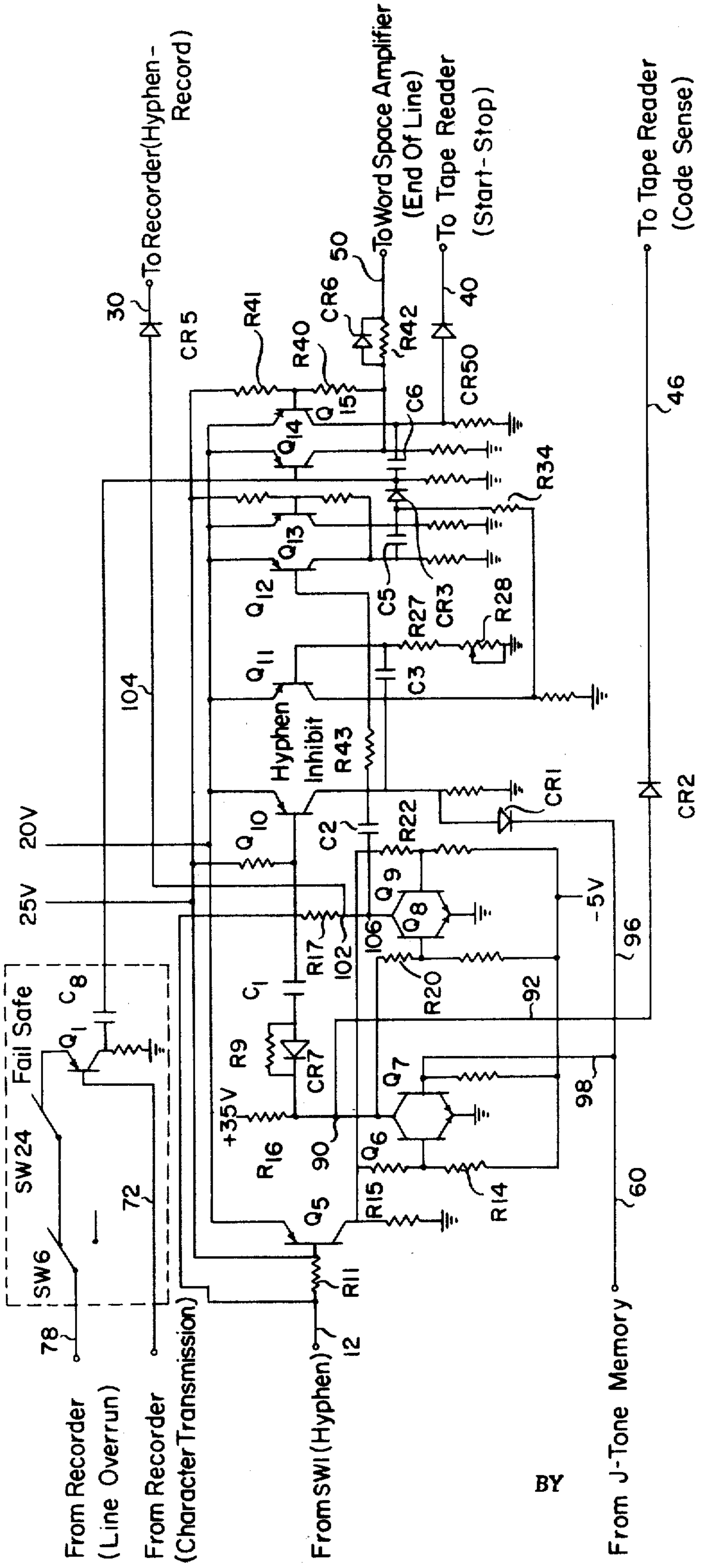
FIG. 2 is a detailed circuit diagram of the hyphen acceptance circuit of FIG. 1.

Referring now to FIG. 2, a first hyphen signal that is sensed by the tape reader 2 is applied to the base of transistor Q6 via switch SW1, conductor 12, resistor R11, the collector follower circuit of Q5, and resistor R15. Assuming that no enabling signal is supplied from the J-zone memory via conductor 60, the companion flip-flop transistor Q7 is non-conductive, and the first hyphen signal is disregarded and is returned unrecorded as a code sense signal to the tape reader via junction 90, conductor 92, diode CR2 and conductor 46.

In accordance with the present invention, the first hyphen signal so triggers the hyphen acceptance circuit 20 that if the next successive signal sensed by the tape reader is a second hyphen signal, the hyphen acceptance circuit will transmit this signal to the counter recorder. More specifically, the trailing edge of the first hyphen signal is also transmitted from junction 90 to the base of normally cut-off transistor Q10 via the time delay circuit including diode CR7, resistor R9 and capacitor C1, whereby Q10 is rendered conductive and the hyphen one-shot inhibiting circuit is activated to apply an inhibit or triggering signal to the base of Q7 via diode CR1, and conductors 96 and 98. Transistor Q7 momentarily becomes conductive to render transistors Q6 and Q8 non-conductive and transistor Q9 conductive, and if at this time the second hyphen signal is supplied to the hyphen acceptance circuit via conductor 12, it is supplied to the counter-recorder 8 (via resistor R11, the collector follower circuit of Q5, resistor R22, the collector follower circuit of Q9, junction 102, conductor 104, diode CR5, and conductor 30), whereby the second hyphen is recorded on the record 62. Since transistor Q11 has removed voltage from R34, the pulse appearing at junction C5, R34 will not go through CR3, so Q14 and Q15 will not be activated to end the line.

Assume now that an enabling J-zone signal from the counter-recorder 8 is applied to the acceptance circuit via conductor 60. The hyphen acceptance circuit is now enabled (i.e., Q7 is rendered conductive, Q6 and Q8 are cut-off, and Q9 is rendered conductive), and if a first hyphen signal should be applied to the hyphen acceptance circuit, it is conducted directly to the recorder via conductor 12, resistor R11, the collector follower Q5, resistor R22, the collector follower Q9, junction 102, conductor 104, diode CR5 and conductor 30. The first hyphen is also conducted to the one-shot multivibrator Q14, Q15 from transistor Q9 via junction 106, capacitor C2, resistor R43, collector follower Q12, capacitor C5, and diode CR3, whereupon an end-of-line signal is transmitted to the word space amplifier via the network including diode CR6 and resistor R42, and conductor 50. Owing to the signal supplied to the base of Q15 via resistor R40, transistor Q15 becomes conductive to supply a signal to the start stop means of tape reader 2 via diode CR50 and conductor 40.

In the event that a second successive hyphen should appear in the series of coded characters on the perforated tape 4, it is conducted to the code sense terminal of tape reader 2 via resistor R11, transistor Q5, resistor R15, transistor Q6, junction 90, conductor 92, diode CR2 and conductor 46.

According to another feature of the invention as illustrated in FIG. 2, fail safe circuit means are provided including a transistor Q1 the emitter of which receives line overrun signals from the counter-recorder means 8 via safety switches SW6 and SW24, and a base electrode that receives character sensing signals from the counter-recorder via conductor 72. The collector follower circuit of transistor Q1 is connected via capacitor C8 with the base of the end-of-line signal generator Q14. The fail safe circuit is so operable that when no hyphen signal or word space signal is applied to the acceptance circuit throughout the justification period, an end-of-line signal is automatically generated when line overrun occurs, whereupon the remaining characters in the series of signals are fed into the next line.

Figure 3:
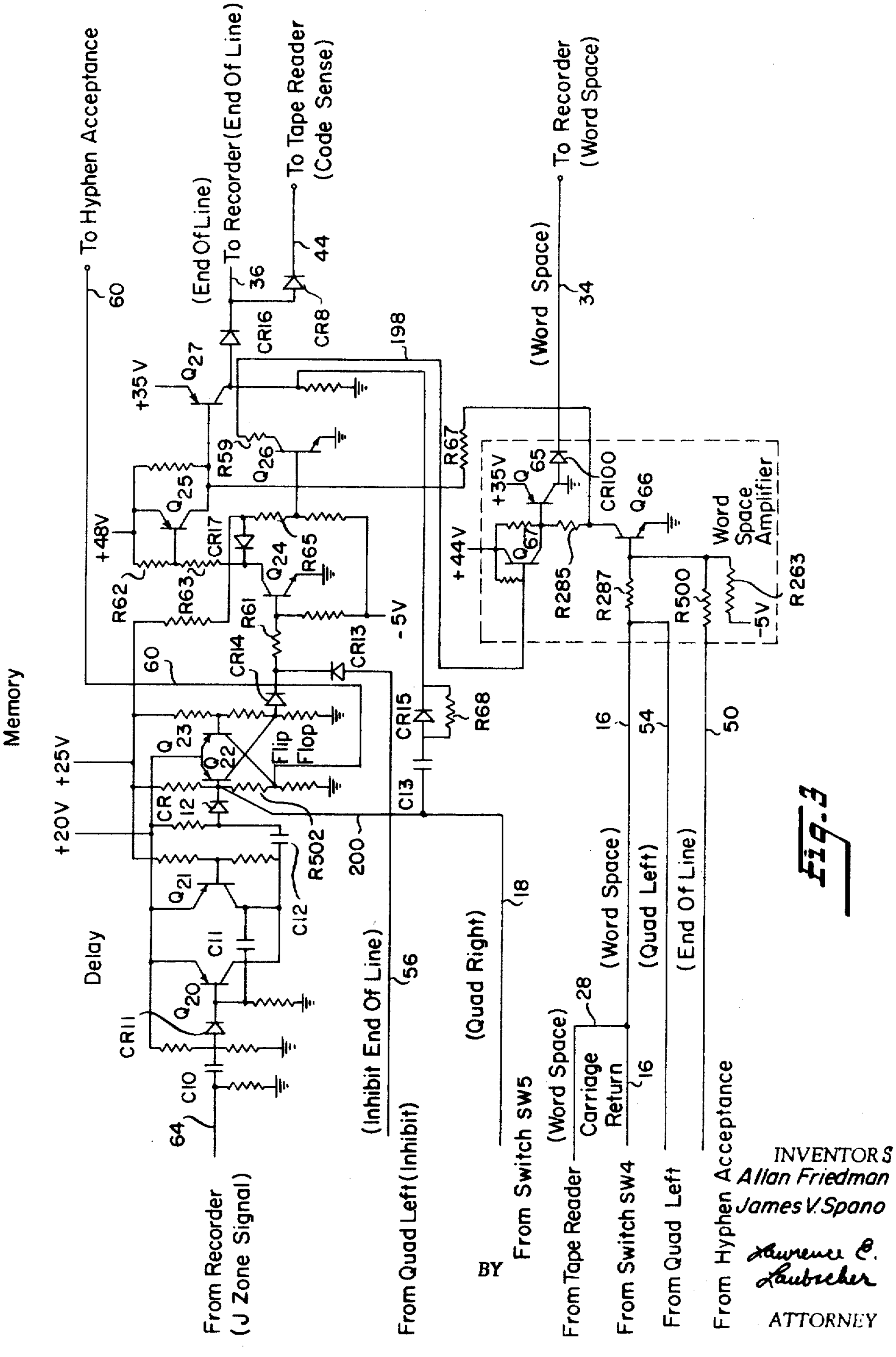
FIG. 3 is a detailed circuit diagram of the end-of-line generator means and word space amplifier means of FIG. 1.

Referring now to FIG. 3, in the absence of an enabling J-zone signal, Q22 conducts heavily to saturate Q24 via diode CR14 and resistor R61, whereby Q25 conducts heavily to cut-off transistor Q67, this in turn allowing Q65 to saturate if Q66 saturates. In this condition, all input signals (word space signal at conductor 28, carriage return signal at conductor 16, quad left signal at conductor 54 and end-of-line signal at conductor 50) are conducted to the recorder as word space signals via Q66, resistor R285, transistor Q65, diode CR100 and conductor 34.

When the sum of the widths of the signals received by the counter recorder during the processing of a line exceed the line length minus the length of the justification zone, the counter-recorder supplies a J-zone signal to the J-zone memory flip-flop transistor Q22 via conductor 64, capacitor C10, diode CR11, collector follower Q20, capacitor C12, and diode CR12, and signal being delayed by capacitor C12. The J-zone signal at the base of Q22 is transmitted to the hyphen acceptance circuit via resistor R502 and conductor 60, and trips the flip-flop memory Q22, Q23, whereby word space transistor Q67 is rendered conductive by the signal applied to its base from the flip-flop via diode CR14, resistor R61 collector follower Q24, diode CR17, resistor R65, transistor Q26, resistor R59 and conductor 198. Furthermore, transistor Q25 is rendered non-conductive (via R63), thereby enabling end-of-line generator transistor Q27. Since Q65 is now cut-off and since Q27 is now conductive, further word space, quad left and end-of-line signals received by transistor Q66 are conducted to the end-of-line input terminal of the counter recorder via resistor R67, collector follower Q27, diode CR16 and conductor 36. All signals supplied to end-of-line signal conductor 36 are also transmitted as code sense signals to the tape reader 2 via diode CR8 and conductor 44.

Assume now that in the absence of a J-zone signal a quad right signal is supplied from switch SW5 via conductor 18. This signal is applied to the flip-flop memory via conductor 200, thereby enabling the hyphen acceptance circuit via conductor 60, the word space amplifier via conductor 198, and the end-of-line generator Q27 via resistor R63 and transistor Q25. The signa lis delayed by the delay network means (C13, R68, and CR15), for transmittal to the counter-recorder as an end-of-line signal via diode CR16 and conductor 36.

As will be described below, the end-of-line signal generator circuit is adapted to be inhibited by the application of an inhibiting signal from the quad left circuit upon the base of Q24 via conductor 56, diode CR13, and resistor R61, whereby transistor Q25 is maintained conductive to disable transistor Q27.

Figure 4:
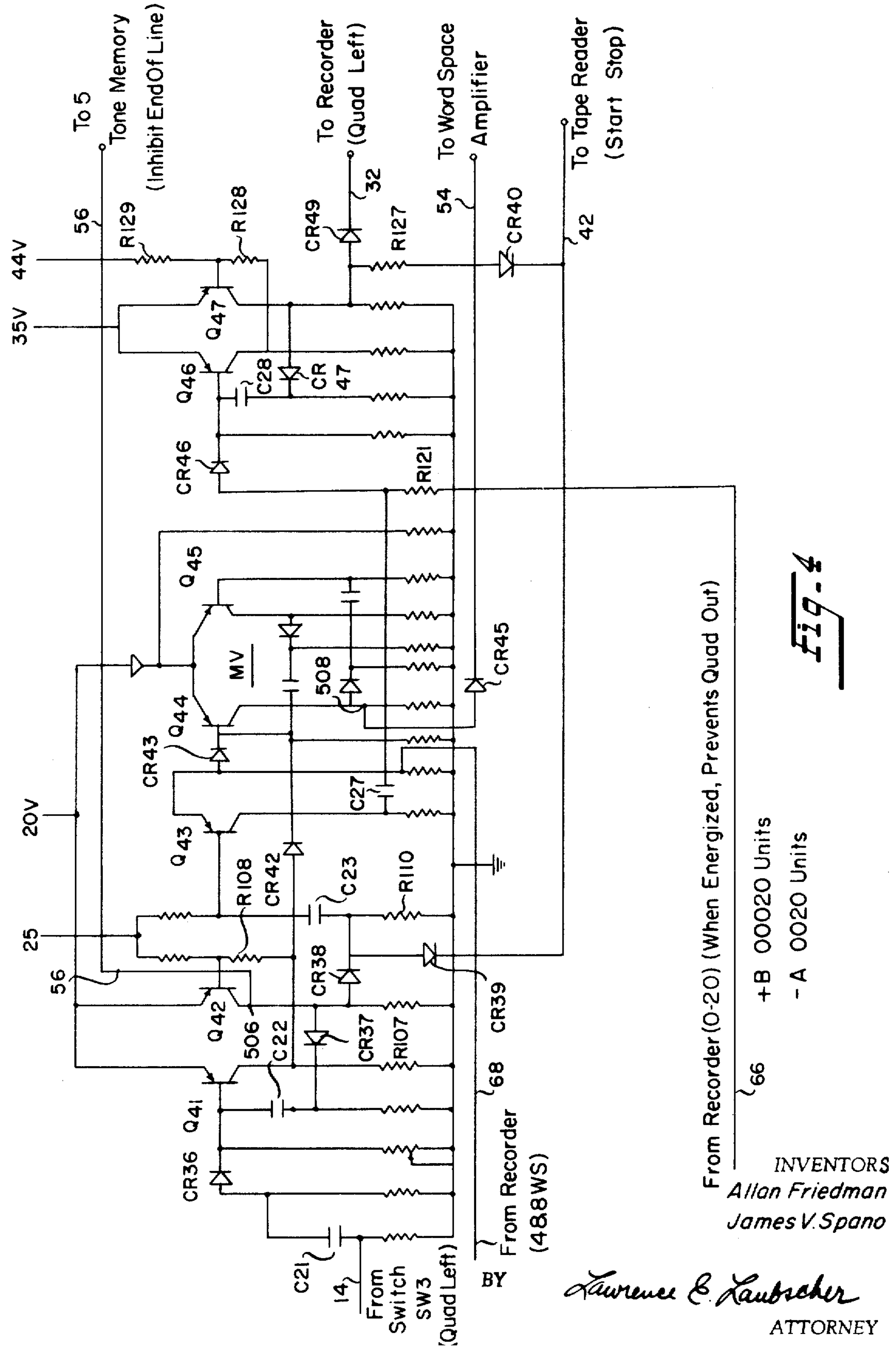
FIG. 4 is a detailed circuit diagram of the quad left means of FIG. 1.

Referring now to FIG. 4, a quad left signal applied to the quad left circuit via conductor 14 is conducted to the base of word space multivibrator transistor Q44 via capacitor C21, diode CR36, collector follower Q41, and diode CR42. The quad left signal is also conducted as the aforementioned inhibiting signal to the end-of-line generator circuit via capacitor C21, diode CR34, collector follower Q41, resistor R108, collector follower Q42 and conductor 56. Furthermore, the quad left signal is conducted from the collector follower Q42 to the recorder as a quad left record signal via junction 506, diode CR38, capacitor C23, collector follower Q43, capacitor C27, diode CR46, collector follower Q46, resistor R128, collector follower Q47, diode CR49 and conductor 32. Finally, the quad left signals are conducted to the start-stop means of the tape reader via diodes CR39 and CR40, and conductor 42.

Owing to the application of the quad left signal upon the base of Q44, the multivibrator is activated to transmit pulses to word space amplifier 24 via junction 508, diode CR45 and conductor 54. The word space signals are conducted to the counter-recorder 8 until four word spaces are generated therein, indicating that the quad line is to be started. This 4 and 8 signal supplies emitter voltage to Q43 via conductor 68, and prevents Q44 from generating further pulses to the word space amplifier via conductor 54. The trailing edge timing of Q41 and Q42 is applied on the base of Q43, and out via the collector of Q43 and through capacitor C27 and diode CR46 to start Q46 and Q47, thereby sending a quad left signal to the recorder via diode CR49, so that it can quad rest of that line. However, if the 0 to 20 line is energized (via conductor 66) before the trailing edge timing of Q41 and Q42, the pulse from the collector of Q43 will not go through CR46 and Q46, and the line will not quad left since there are 20 or less units left on the counter recorder.

OPERATION

As is apparent from the operation of the invention presented above, when the mode switches SW1, SW3, SW4, SW5, and SW6 are switched from their FIG. 1 positions to the hypen based data processing positions, during the composing of a given line, the unjustified character signals are supplied to the counter-recorder 8 via conductors 6, the word space and carriage return signals are conducted to the recorder via the word space amplifier 24, and the hyphen signals are transmitted to the recorder via the hyphen acceptance circuit. The character, word space and carriage return signals are recorded on the tape 62, the width values of these signals being counted by the counter and being recorded also on the tape. According to the operation of the hyphen acceptance circuit, only those hyphen signals which are preceded by a single hyphen signal are transmitted to the counter-recorder for counting of the single hyphen width value, and for recordation of the single hyphen, together with the width value, on the tape. When the sum of the widths exceeds the value equal to the line length minus the justification range, the J-zone signal is generated, whereupon the characters continue to be recorded upon the record 62 until the next hyphen is sensed by the hyphen acceptance circuit 20, whereupon the hyphen and an end-of-line signal (and also a justification control signal) are recorded on the tape 62. Similarly, in the event that a word space or carriage return signal is received during the justification zone range, this signal is recorded as an end-of-line signal on the magnetic tape. In the event that no hyphen, word space or carriage return signal is received during the justification zone range, the fail safe circuit 74 operates to record on tape 62 an end-of-line signal. Owing to this protective system, only one or two lines need be corrected to properly justify the same, rather than by completely editing the subsequent text. The justified record 62 may then be used to control the operation of a photocomposing apparatus, type setting apparatus or the like, as desired.

While in accordance with the provisions of the Patent Statutes I have illustrated and described the preferred embodiment of the invention now known by me, it will be apparent to those skilled in the art that changes may be made in the disclosed apparatus and method without deviation from the invention set forth in the following claims.

What is claimed is:

1. Data processing apparatus for inserting within an unjustified series of first signals a plurality of end-of-line signals dividing said series of first signals into lines of substantially equal length, said first signals including character signals, word space signals and given advisory signals, comprising output register means adapted for connection with a source of said series of first signals and operable to generate a J-zone signal when the sum of the widths of the first signals received thereby exceeds a given value less than the line length;

acceptance circuit means for controlling the supply of said advisory signals from the source to said output register means, said acceptance circuit means having a normally-disabled first condition in the absence of said J-zone signal for transmitting to said output register an advisory signal only when two identical ones of said given advisory signals appear in succession in said series, said acceptance circuit means being enabled by said J-zone signal to a second condition for transmitting to said output register means a single advisory signal either when one of said given advisory signals appears alone in said series or when two of said given advisory signals appear in succession in said series;

and normally-disabled end-of-line signal generator means operable, when enabled by said J-zone signal, upon the transmission of an advisory signal by said acceptance circuit to said output register to supply an end-of-line signal to said output register.

2. Apparatus as defined in claim 1, and further including fail safe circuit means for operating said end-of-line signal generator means in the event that no advisory signal is transmitted to said output register within a given time period following the generation of said J-zone signal.

3. Apparatus as defined in claim 1, and further including normally-disabled word space amplifier means operable, when enabled by said J-zone signal, in response to a word space signal to cause said signal generator means to supply an end of line signal to said output register.

4. Apparatus as defined in claim 3, wherein said first signals correspond with the signals of a conventional keyboard system, said advisory signal comprising the conventional hyphen signal of the system, said series of signals comprising also second signals including quad left, quad right and carriage return instruction signals, said word space amplifier means being operable by said carriage return signal to effect recordation in said output register of word space and end-of-line signals when said word space amplifier means is in the disabled and enabled conditions, respectively.

5. Apparatus as defined in claim 4, and further including quad left circuit means operable by said quad left instruction signal to supply a plurality of word space signals to said word space amplifier means, whereby when said word space amplifier means are in the disabled condition, word space signals are transmitted to said output register.

6. Apparatus as defined in claim 5, wherein said output register is operable to provide to said quad left circuit means a disabling signal when the sum of the widths of said first signals received by said output register exceeds a value less than the line length but greater than the value at which said J-zone signal is generated, said quad left circuit means being operable by said disabling signal to interrupt the supply of word space signals to said word space amplifier means.

7. Apparatus as defined in claim 6, and further wherein said output register is operable to provide to said quad left circuit means an activating signal when the number of word space signals received by said output register is less than a given value, said quad left circuit means being operable, when in the enabled condition, by said operating signal to supply up to a given number of word space signals to said output register via said word space amplifier means.

8. Apparatus as defined in claim 4, and further including code converter means for supplying to said output register said series of first and second signals, said code converter means having input means for detecting coded signals recorded on an input register.

9. Apparatus as defined in claim 8 wherein said code converter means comprises perforated tape reader means including a matrix having distinctive output terminals for each of said first and second signals, respectively; and further including a pluraltiy of conductor means connecting the character signal terminals with said output register, respectively, and switch means operable in a first mode to conduct said hyphen, carriage return, quad left and quad right signals directly to said output register, respectively, and in a second mode to conduct said hyphen, carriage return, quad left and quad right signals to the inputs of said acceptance circuit means, said word space amplifier means, said quad left circuit means and said end of line signal generator means, respectively.

10. Apparatus as defined in claim 9 wherein said output register means further includes counter-recorder means operable to record on a magnetic tape said series of first and second signals and said end-of-line signals.

11. Apparatus as defined in claim 1 wherein said end-of-line signal generator means includes bistable memory means operable by said J-zone signal, and delay means for delaying the J-zone signal supplied to said memory means.

12. Apparatus as defined in claim 5, and further including means responsive to said quad left signal for inhibiting operation of the end-of-line signal generator means when said word space signals are supplied to said word space amplifier means by said quad left circuit means.

References Cited

UNITED STATES PATENTS

| | | | |
|---|---|---|---|
| 2,379,862 | 7/1945 | Bush | 197—84 |
| 2,961,644 | 11/1960 | Gardiner | 340—172.5 |
| 3,260,340 | 7/1966 | Locklar et al. | 197—20 X |
| 3,289,176 | 11/1966 | Garth et al. | 340—172.5 |
| 3,312,953 | 4/1967 | Wang et al. | 340—172.5 |
| 3,439,341 | 4/1969 | Dalby et al. | 340—172.5 |

PAUL J. HENON, Primary Examiner

P. R. WOODS, Assistant Examiner

U.S. Cl. X.R.

197—84